US009948721B2

(12) United States Patent
Tanaka

(10) Patent No.: US 9,948,721 B2
(45) **Date of Patent: *Apr. 17, 2018**

(54) METHODS AND SYSTEMS FOR PROVIDING TIME AND DATE SPECIFIC SOFTWARE USER INTERFACES

(71) Applicant: salesforce.com, inc., San Francisco, CA (US)

(72) Inventor: Jay Tanaka, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 14/613,172

(22) Filed: Feb. 3, 2015

(65) Prior Publication Data

US 2015/0149917 A1 May 28, 2015

Related U.S. Application Data

(63) Continuation of application No. 12/831,196, filed on Jul. 6, 2010, now Pat. No. 8,977,675.

(60) Provisional application No. 61/317,973, filed on Mar. 26, 2010.

(51) Int. Cl.
*H04L 29/08* (2006.01)
*G06F 9/50* (2006.01)

(52) U.S. Cl.
CPC ............ *H04L 67/14* (2013.01); *G06F 9/5011* (2013.01); *H04L 67/02* (2013.01); *H04L 67/22* (2013.01)

(58) Field of Classification Search
CPC ....................................................... H04L 67/22
See application file for complete search history.

(56) References Cited

U.S. PATENT DOCUMENTS 5,072,370 A 12/1991 Durdik
5,577,188 A 11/1996 Zhu
5,608,872 A 3/1997 Schwartz et al.
5,649,104 A 7/1997 Carleton et al.
(Continued)

FOREIGN PATENT DOCUMENTS

WO WO 2004/059420 7/2004

OTHER PUBLICATIONS

U.S. Office Action dated Aug. 24, 2012 issued in U.S. Appl. No. 12/831,196.
(Continued)

*Primary Examiner* — Jimmy H Tran
(74) *Attorney, Agent, or Firm* — Weaver Austin Villeneuve & Sampson LLP

(57) ABSTRACT

Computer systems, methods and software for responding to remote clients with content selected based on when the request is made. The method may include selecting one or more interface components based on the time of day and/or date of the request, and returning a response including the selected interface components. The method may include adjusting the time for a time zone for the remote client and/or user. Interface components may be fully embedded in the response, or may be references to external components. Interface components may include data relating to a user task associated with the date and/or time of day, formatting information for displaying the task data to the user of the remote client, instructions for user interaction with the task data, etc.

14 Claims, 8 Drawing Sheets

(56) References Cited

U.S. PATENT DOCUMENTS

| | | | |
|---|---|---|---|
| 5,715,450 | A | 2/1998 | Ambrose et al. |
| 5,761,419 | A | 6/1998 | Schwartz et al. |
| 5,787,437 | A | 7/1998 | Potterveld et al. |
| 5,794,232 | A | 8/1998 | Mahlum et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,941,947 | A | 8/1999 | Brown et al. |
| 5,950,190 | A | 9/1999 | Yeager et al. |
| 5,963,953 | A | 10/1999 | Cram et al. |
| 5,974,409 | A | 10/1999 | Sanu et al. |
| 5,983,227 | A | 11/1999 | Nazem et al. |
| 5,987,471 | A | 11/1999 | Bodine et al. |
| 6,064,656 | A | 5/2000 | Angal et al. |
| 6,085,191 | A | 7/2000 | Fisher et al. |
| 6,092,083 | A | 7/2000 | Brodersen et al. |
| 6,112,198 | A | 8/2000 | Lohman et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,226,641 | B1 | 1/2001 | Hickson et al. |
| 6,189,000 | B1 | 2/2001 | Gwertzman et al. |
| 6,189,011 | B1 | 2/2001 | Lim et al. |
| 6,189,024 | B1 * | 2/2001 | Bauersfeld ........ G06F 17/30873 707/999.01 |
| 6,216,133 | B1 | 4/2001 | Masthoff |
| 6,216,135 | B1 | 4/2001 | Brodersen et al. |
| 6,219,667 | B1 | 4/2001 | Lu et al. |
| 6,233,617 | B1 | 5/2001 | Rothwein et al. |
| 6,233,618 | B1 | 5/2001 | Shannon |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,330,560 | B1 | 12/2001 | Harrison et al. |
| 6,332,127 | B1 | 12/2001 | Bandera et al. |
| 6,336,137 | B1 | 1/2002 | Lee et al. |
| 6,341,288 | B1 | 1/2002 | Yach et al. |
| 6,345,288 | B1 | 2/2002 | Reed et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,438,562 | B1 | 8/2002 | Gupta et al. |
| 6,446,089 | B1 | 9/2002 | Brodersen et al. |
| 6,446,109 | B2 | 9/2002 | Gupta |
| 6,453,038 | B1 | 9/2002 | McFarlane et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong |
| 6,574,635 | B2 | 6/2003 | Stauber et al. |
| 6,577,726 | B1 | 6/2003 | Huang et al. |
| 6,578,037 | B1 | 6/2003 | Wong et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,148 | B1 | 8/2003 | Salo et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,658,417 | B1 | 12/2003 | Statukis et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,721,765 | B2 | 4/2004 | Ghosh et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshaysky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,839,680 | B1 | 1/2005 | Liu et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 6,944,133 | B2 | 9/2005 | Wisner et al. |
| 6,947,927 | B2 | 9/2005 | Chaudhuri et al. |
| 7,062,502 | B1 | 6/2006 | Kesler |
| 7,069,231 | B1 | 6/2006 | Cinarkaya et al. |
| 7,069,497 | B1 | 6/2006 | Desai |
| 7,076,633 | B2 | 7/2006 | Tormasov et al. |
| 7,093,020 | B1 * | 8/2006 | McCarty ................ H04L 67/14 709/229 |
| 7,100,111 | B2 | 8/2006 | McElfresh et al. |
| 7,152,109 | B2 | 12/2006 | Suorsa et al. |
| 7,174,483 | B2 | 2/2007 | Worrall et al. |
| 7,181,758 | B1 | 2/2007 | Chan |
| 7,185,192 | B1 | 2/2007 | Kahn |
| 7,206,805 | B1 | 4/2007 | McLaughlin, Jr. |
| 7,206,807 | B2 | 4/2007 | Cheenath |
| 7,209,929 | B2 | 4/2007 | Dominguez, Jr. et al. |
| 7,249,118 | B2 | 7/2007 | Sandler et al. |
| 7,269,590 | B2 | 9/2007 | Hull et al. |
| 7,289,976 | B2 | 10/2007 | Kihneman et al. |
| 7,305,577 | B2 | 12/2007 | Zhang |
| 7,308,704 | B2 | 12/2007 | Vogel et al. |
| 7,340,411 | B2 | 3/2008 | Cook |
| 7,350,237 | B2 | 3/2008 | Vogel et al. |
| 7,356,482 | B2 | 4/2008 | Frankland et al. |
| 7,373,364 | B1 | 5/2008 | Chapman |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,448,079 | B2 | 11/2008 | Tremain |
| 7,454,509 | B2 | 11/2008 | Boulter et al. |
| 7,484,219 | B2 | 1/2009 | Mitra |
| 7,508,789 | B2 | 3/2009 | Chan |
| 7,529,728 | B2 | 5/2009 | Weissman et al. |
| 7,577,092 | B2 | 8/2009 | San Andres et al. |
| 7,580,975 | B2 | 8/2009 | Cheenath |
| 7,599,935 | B2 | 10/2009 | La Rotonda et al. |
| 7,599,953 | B2 | 10/2009 | Galindo-Lagaria et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,661,027 | B2 | 2/2010 | Langen et al. |
| 7,668,861 | B2 | 2/2010 | Steven |
| 7,693,820 | B2 | 4/2010 | Larson et al. |
| 7,698,160 | B2 | 4/2010 | Beaven et al. |
| 7,730,478 | B2 | 6/2010 | Weissman |
| 7,734,608 | B2 | 6/2010 | Fell et al. |
| 7,747,648 | B1 | 6/2010 | Kraft et al. |
| 7,769,825 | B2 | 8/2010 | Karakashian et al. |
| 7,774,366 | B2 | 8/2010 | Fisher et al. |
| 7,779,039 | B2 | 8/2010 | Weissman et al. |
| 7,779,475 | B2 | 8/2010 | Jakobson et al. |
| 7,814,052 | B2 | 10/2010 | Bezar et al. |
| 7,814,470 | B2 | 10/2010 | Mamou et al. |
| 7,827,138 | B2 | 11/2010 | Salmon et al. |
| 7,827,208 | B2 | 11/2010 | Bosworth et al. |
| 7,849,401 | B2 | 12/2010 | Elsa et al. |
| 7,853,881 | B1 | 12/2010 | Aly Assal et al. |

(56) References Cited

U.S. PATENT DOCUMENTS 7,945,653 B2 5/2011 Zukerberg et al.
8,005,896 B2 8/2011 Cheah
8,014,943 B2 9/2011 Jakobson
8,015,495 B2 9/2011 Achacoso et al.
8,032,297 B2 10/2011 Jakobson
8,073,850 B1 12/2011 Hubbard et al.
8,082,301 B2 12/2011 Ahlgren et al.
8,095,413 B1 1/2012 Beaven
8,095,531 B2 1/2012 Weissman et al.
8,095,594 B2 1/2012 Beaven et al.
8,103,611 B2 1/2012 Tuzhilin et al.
8,150,913 B2 4/2012 Cheah
8,209,308 B2 6/2012 Rueben et al.
8,209,333 B2 6/2012 Hubbard et al.
8,275,836 B2 9/2012 Beaven et al.
8,443,366 B1 5/2013 Yancey
8,457,545 B2 6/2013 Chan
8,473,518 B1 6/2013 Yancey et al.
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
8,667,563 B1 * 3/2014 Sandoval ................ G06F 21/31 713/182
8,776,067 B1 7/2014 Yancey
8,819,632 B2 8/2014 Williams et al.
8,972,431 B2 3/2015 Press et al.
8,977,675 B2 3/2015 Tanaka
9,069,901 B2 6/2015 Varadharajan
9,189,090 B2 11/2015 Tanaka
9,361,366 B1 6/2016 Yancey et al.
2001/0023440 A1 9/2001 Franklin et al.
2001/0044791 A1 11/2001 Richter et al.
2002/0072951 A1 6/2002 Lee et al.
2002/0082892 A1 6/2002 Raffel et al.
2002/0129352 A1 9/2002 Brodersen et al.
2002/0133392 A1 9/2002 Angel et al.
2002/0140731 A1 10/2002 Subramaniam et al.
2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0217332 A1 * 11/2003 Smith ................... G06Q 30/02 715/234
2003/0225730 A1 12/2003 Warner et al.
2004/0001092 A1 1/2004 Rothwein et al.
2004/0010489 A1 1/2004 Rio et al.
2004/0015578 A1 1/2004 Karakashian et al.
2004/0015981 A1 1/2004 Coker et al.
2004/0027388 A1 2/2004 Berg et al.
2004/0044656 A1 3/2004 Cheenath
2004/0045004 A1 3/2004 Cheenath
2004/0111410 A1 6/2004 Burgoon et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0220952 A1 11/2004 Cheenath
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2005/0188318 A1 * 8/2005 Tamir ................. G06F 11/3438 715/744
2005/0283478 A1 12/2005 Choi et al.
2006/0075110 A1 * 4/2006 Seraphin ................ H04L 63/08 709/227
2006/0095960 A1 5/2006 Arregoces et al.
2006/0100912 A1 5/2006 Kumar et al.
2006/0136382 A1 6/2006 Dettinger et al.
2007/0078705 A1 4/2007 Abels et al.
2007/0088741 A1 4/2007 Brooks et al.
2007/0124276 A1 5/2007 Weissman et al.
2007/0130130 A1 6/2007 Chan et al.
2007/0130137 A1 6/2007 Oliver et al.
2007/0150546 A1 6/2007 Karakashian et al.
2007/0226640 A1 9/2007 Holbrook et al.
2008/0010243 A1 1/2008 Weissman et al.
2008/0065991 A1 * 3/2008 Grimes ............ G06F 17/30867 715/719
2008/0082540 A1 4/2008 Weissman et al.
2008/0082572 A1 4/2008 Ballard et al.
2008/0082986 A1 4/2008 Cheenath et al.
2008/0086358 A1 4/2008 Doshi et al.
2008/0086447 A1 4/2008 Weissman et al.
2008/0086479 A1 4/2008 Fry et al.
2008/0086482 A1 4/2008 Weissman et al.
2008/0086514 A1 4/2008 Weissman et al.
2008/0086567 A1 4/2008 Langen et al.
2008/0086735 A1 4/2008 Cheenath et al.
2008/0162544 A1 7/2008 Weissman et al.
2008/0201701 A1 8/2008 Hofhansel et al.
2008/0215560 A1 9/2008 Bell et al.
2008/0249972 A1 10/2008 Dillon
2008/0250026 A1 * 10/2008 Linden ............. G06F 17/30867
2008/0270354 A1 10/2008 Weissman et al.
2008/0270987 A1 10/2008 Weissman et al.
2009/0030906 A1 1/2009 Doshi et al.
2009/0049065 A1 2/2009 Weissman et al.
2009/0049101 A1 2/2009 Weissman et al.
2009/0049102 A1 2/2009 Weissman et al.
2009/0049288 A1 2/2009 Weissman et al.
2009/0063415 A1 3/2009 Chatfield et al.
2009/0100342 A1 4/2009 Jakobson
2009/0164283 A1 6/2009 Coley
2009/0177744 A1 7/2009 Marlow et al.
2009/0276395 A1 11/2009 Weissman et al.
2009/0276405 A1 11/2009 Weissman et al.
2009/0282045 A1 11/2009 Hsieh et al.
2009/0319529 A1 12/2009 Bartlett et al.
2010/0191719 A1 7/2010 Weissman et al.
2010/0205216 A1 8/2010 Durdik et al.
2010/0211619 A1 8/2010 Weissman et al.
2010/0223284 A1 9/2010 Brooks et al.
2010/0235837 A1 9/2010 Weissman et al.
2010/0274779 A1 10/2010 Weissman et al.
2011/0066977 A1 3/2011 DeLuca et al.
2011/0078213 A1 3/2011 Bezar et al.
2011/0218958 A1 9/2011 Warshaysky et al.
2011/0234482 A1 9/2011 Tanaka
2011/0238736 A1 9/2011 Tanaka
2011/0247051 A1 10/2011 Bulumulla et al.
2011/0276535 A1 11/2011 Pin et al.
2011/0276580 A1 11/2011 Press et al.
2011/0276834 A1 11/2011 Calahan et al.
2012/0011406 A1 1/2012 Williams et al.
2012/0042218 A1 2/2012 Cinarkaya et al.
2012/0047489 A1 2/2012 Varadharajan
2012/0233137 A1 9/2012 Jakobson et al.
2012/0290407 A1 11/2012 Hubbard et al.
2013/0212497 A1 8/2013 Zelenko et al.

(56) References Cited

U.S. PATENT DOCUMENTS

| | | | |
|---|---|---|---|
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2014/0359537 | A1 | 12/2014 | Jakobson et al. |
| 2015/0006289 | A1 | 1/2015 | Jakobson et al. |
| 2015/0007050 | A1 | 1/2015 | Jakobson et al. |
| 2015/0095162 | A1 | 4/2015 | Jakobson et al. |
| 2015/0142596 | A1 | 5/2015 | Jakobson et al. |
| 2015/0172563 | A1 | 6/2015 | Jakobson et al. |

OTHER PUBLICATIONS

U.S. Final Office Action dated Jan. 15, 2013 issued in U.S. Appl. No. 12/831,196.
U.S. Notice of Allowance dated Nov. 3, 2014 issued in U.S. Appl. No. 12/831,196.
First named inventor: Yancey, Scott, U.S. Appl. No. 12/132,409, filed Jun. 3, 2008.
First named inventor: Durdik, Paul, U.S. Appl. No. 12/549,349, filed Aug. 27, 2009.
First named inventor: Yancey, Scott, U.S. Appl. No. 12/197,979, filed Aug. 25, 2008.
First named inventor: Calahan, Patrick, U.S. Appl. No. 12/954,556, filed Nov. 24, 2010.
First named inventor: Pin, Olivier, U.S. Appl. No. 12/895,833, filed Sep. 30, 2010.
First named inventor: Press, William A., U.S. Appl. No. 12/850,502, filed Aug. 4, 2010.
First named inventor: Tanaka, Jay, U.S. Appl. No. 12/831,209, filed Jul. 6, 2010.
First named inventor: Williams, Alexis, U.S. Appl. No. 13/028,236, filed Feb. 16, 2011.
First named inventor: Varadharajan, Arunkumaran, U.S. Appl. No. 12/909,820, filed Oct. 21, 2010.
Notification of Transmittal of the International Search Report and the Written Opinion of the International Searching Authority, or the Declaration. International Application No. PCT/US2010/050021. International Filing Date: Sep. 23, 2010.
"Customer Relationship Management" from Wikipedia, the free encyclopedia, [online]; [published on Oct. 16, 2008]; [retrieved on Feb. 26, 2010]; retrieved from http://en.wikipedia.org/wiki. Customer_Relationship_Management, 1 page.
"Flat file database"—Wikipedia, the free encyclopedia, [online]; [published on Apr. 22, 2008]; [retrieved on Feb. 26, 2010]; retrieved from http://en.wikipedia.org/wiki/Flat_file_database, 4 pp.
"Google Plus Users", Google+Ripples, Oct. 31, 2011 [retrieved on Feb. 21, 2012 from Internet at http://www.googleplusers.com/google-ripples.html], 3 pages.
"Push technology"—Wikipedia, the free encyclopedia, [online]; [published on Oct. 17, 2008]; [retrieved on Feb. 26, 2010]; retrieved from http://en.wikipedia.org/wiki/Push_technology, 4 pp.
"Relational database"—Wikipedia, the free encyclopedia, [online]; [published on Apr. 25, 2008]; [retrieved on Feb. 26, 2010]; retrieved from http://en.wikipedia.org/wiki/Relational_database, 6 pp.
Lee et al. "Composition of executable business process models by combining business rules and process flows", Expert Systems With Application, Oxford, GB, vol. 33, No. 1, Dec. 22, 2006 pp. 221-229.
Mietzer et al. (2009) "Combining Different Multi-Tenancy Patterns in Service-Oriented Applications", *IEEE International Enterprise Distributed Object Computing Conference*, NJ, USA, pp. 131-140.
Wang et al. (2009) "Integrated Constraint Violation Handling for Dynamic Services Composition", *IEE International Conference on Services Computing*, NJ, USA, pp. 168-175.
Wermelinger et al. (2003) "Using coordination contracts for flexible adaptation to changing business rules", *Proceedings of the Sixth International Workshop on Software Evolution*, NJ, USA, pp. 115-120.
Wang et al. (2008) "A Study and Performance Evaluation of the Multi-Tenant Data Tier Design Patterns for Service Oriented Computing", *IEEE International Conference On E-Business Engineering*, NJ, USA, pp. 94-101.

* cited by examiner (BACKGROUND)

(BACKGROUND)

METHODS AND SYSTEMS FOR PROVIDING TIME AND DATE SPECIFIC SOFTWARE USER INTERFACES

CROSS-REFERENCE TO RELATED PATENT APPLICATIONS

This application is a continuation of U.S. patent application Ser. No. 12/831,196 filed Jul. 6, 2010 entitled METHODS AND SYSTEMS FOR PROVIDING TIME AND DATE SPECIFIC SOFTWARE USER INTERFACES, which claims the benefit of U.S. Provisional Application No. 61/317,973 filed on Mar. 26, 2010 entitled METHOD FOR PROVIDING TIME AND DATE SPECIFIC COMPUTER INTERFACES; both applications are hereby incorporated herein by reference in their entireties.

BACKGROUND

The present invention generally relates to the computer systems, methods, and software for responding to remote client requests. More specifically, embodiments of the present invention pertain to responding to remote clients with content selected based on when the request is made.

Typical Web systems employ HTTP (Hypertext Transfer Protocol) as a communication protocol used between a Web browser and a Web server (i.e., HTTP server). In HTTP, communication is initiated by the Web browser. Namely, one HTTP communication is comprised of an HTTP request issued by the Web browser and an HTTP response returned by the Web server in response to the HTTP request.

Referring now to FIG. 1, a response 100 from a web server typically includes a response header 101 and a body 102. The header 101 may include cookies 110, such as a session id 111 which the Web browser can return to associate future requests with a single session. The body 102 typically comprises an HTML "page" 120 that includes both data and formatting information for display to a user of the Web browser. Many conventional Web applications divide a display area into interface components (e.g., portlets, sidebars, banners, etc.), where each component is associated with a particular task or type of data and given a portion of the Web browser display area.

FIG. 2 shows an exemplary web page display area 240 with a banner area 241, and sidebar area 242, and a main body area 243. Sidebar area 242 is further divided into areas 245, 246, and 247. These interface components may be incorporated within the body of a response within HTML sections such as <div> tags 141, 142, and 143 of FIG. 1) or may be references to external data (e.g., data to be retrieved by further HTTP requests) with HTML sections such as <iframe> tags 145, 146, and 147. An HTML page may also include interface components such as cascading style sheets (CSS) (e.g., <style> tag 132) and JavaScript code (e.g., <script> tag 131) to further define and/or customize the layout, formatting, behavior, and other attributes of the HTML page.

The user of a Web browser typically communicates with the Web server via a series of HTTP requests and responses. Each response typically provides links or other interface affordances (e.g., forms, JavaScript actions, etc.) to retrieve data and/or to perform tasks. Typically, a web page is built from the same set of interface components every time the user accesses a given Web page or application, unless new features or added or the user manually changes one or more of the interface components. For example, in a portal application the user may have configured a sports section, a financial news section, and a stock price section. When the user visits the portal Web application, the interface components are selected from the sections selected by the user. The same interface components are selected displayed every time the user visits the "home" page of the Web application. Thus, the user interface for a Web application generally remains the same, independent of the time of day, day of the week, day of the year, etc.

SUMMARY OF THE INVENTION

It would be beneficial to the user if the Web server were to change the user interface dynamically depending on the time at which the Web server is accessed in order to give the user quicker, easier, or automatic access to items, pages, data, or screens they need, without them having to explicitly select or request them. The embodiments described herein include methods and systems for responding to remote clients in a time and/or date sensitive manner. An embodiment of a method may include steps of receiving a request from a remote client, determining a time of day and/or a date for the request, selecting one or more interface components based on the time of day and/or date, and returning a response to the client including the selected interface components. In some embodiments, the method includes determining a time zone for the remote client and/or user and selecting one or more of the interface components based on the time adjusted for the time zone.

Interface components may be fully embedded in the response, or may be references to external components. The interface components may include, for example, style and/or formatting information (e.g., cascading style sheet [CSS] data), executable code (e.g., scripts, browser add-ons and extensions, Java applets, ActiveX controls, etc.), structured and/or formatted data, etc. Thus, one or more of the selected interface components may include data relating to a user task, where the task is particularly associated with a date and/or time of day. The interface components may further comprise instructions and/or formatting information for displaying the task data to the user of the remote client. Other interface components may include instructions and/or information (e.g., scripts, html forms, hyperlinks, etc.) for user interaction with the task data.

In an exemplary embodiment, the method may include determining a current time period (e.g., the current business day), determining a time of previous access by the remote client and/or the remote user, and selecting one or more of the interface components based on whether said time of previous access is within said current time period (e.g., to display tasks scheduled for the beginning of the business day).

In some embodiments, the method includes determining a time of previous access by the remote client and/or user and selecting one or more of the interface components based on a duration of a period between the time of previous access and the time of day for the request. In other embodiments, the method includes creating and/or accessing session data corresponding to the request and setting a session duration for the session data based on the time of day (e.g., to provide a longer login session during normal business hours and/or on business days).

In another embodiment, the method may include selecting one or more current time periods from a plurality of predefined time periods (e.g., "morning," "lunchtime," "afternoon", "during business hours," "holiday," etc.) and selecting one or more of the interface components based on the current time period(s).

These and other embodiments are described more fully below.

DETAILED DESCRIPTION OF THE INVENTION

The systems, methods, and software of the present invention provide mechanisms for providing the user of a remote client computer with a web application experience by acting upon time-based values in order to customize, stylize, or differentiate information displayed to the user, to help them work more effectively. Embodiments of the invention may, for example, present sets of data and/or tools adapted to the user's likely needs to help them prioritize and perform tasks at an appropriate time.

FIGS. 3-8 generally show exemplary methods including steps of receiving a request from a remote client, determining a time of day and/or a date for the request, selecting one or more interface components based on the time of day and/or date, and returning a response to the client including the selected interface components. It will be recognized that the methods described herein may be implemented as software instructions to be executed on one or more computer processing systems.

Figure 1:
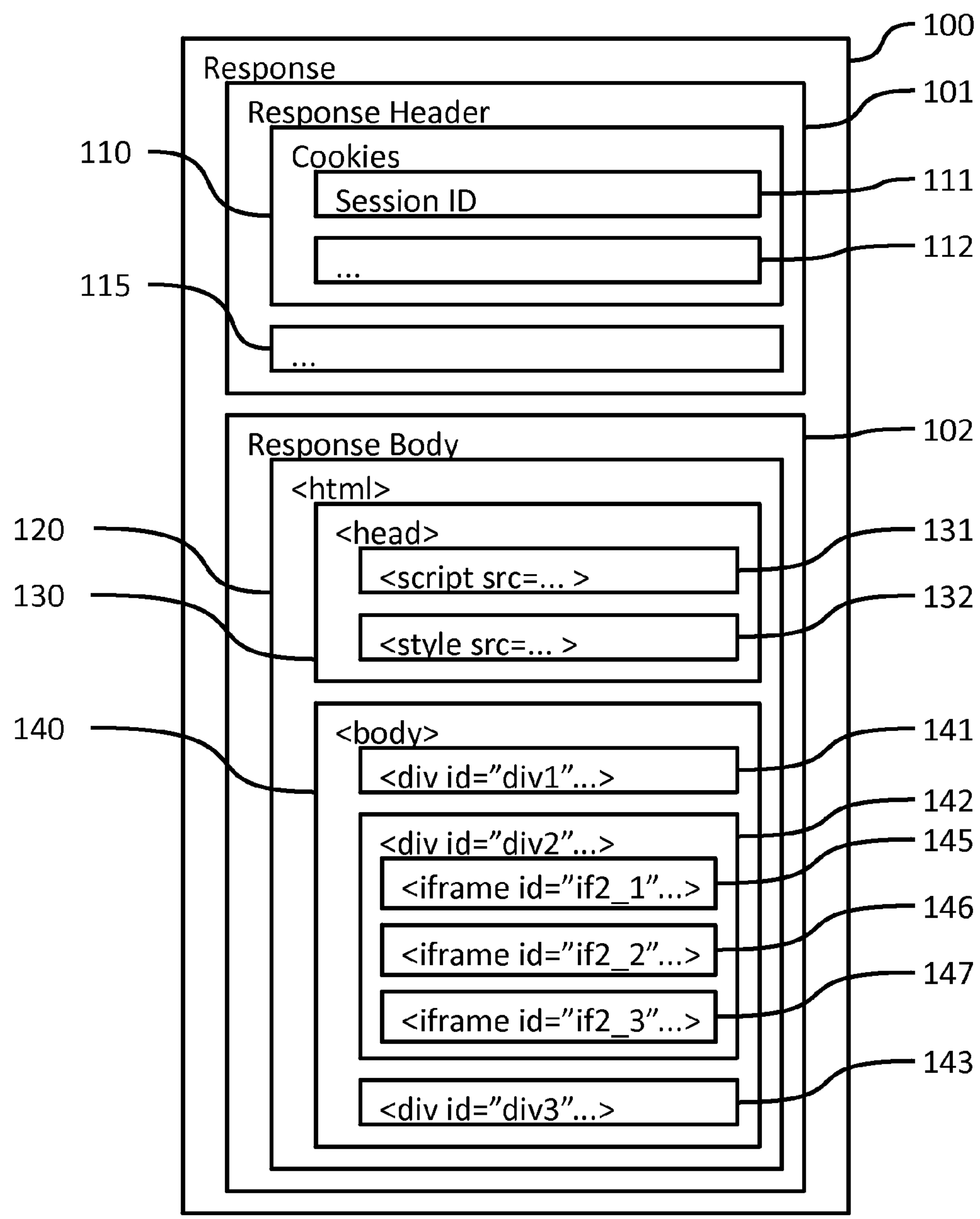
FIG. 1 is a diagram of an exemplary HTTP response.
Figure 2:
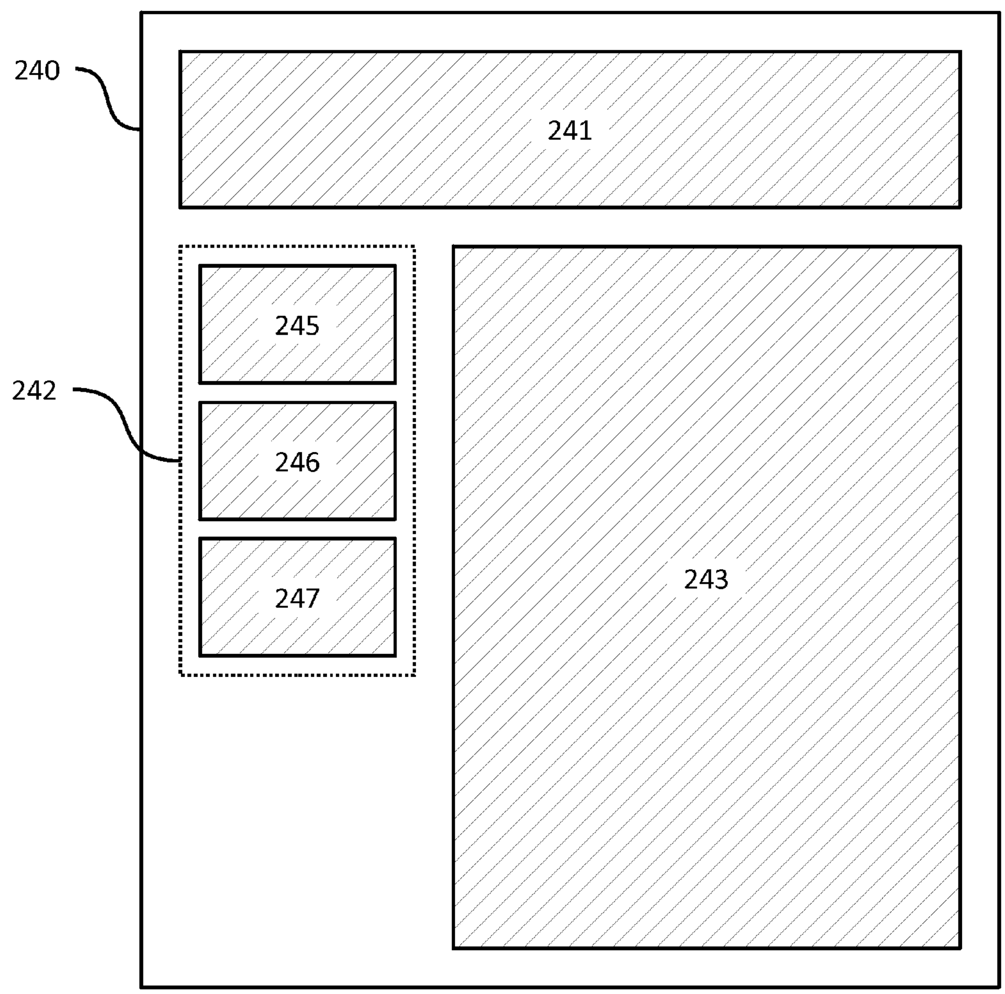
FIG. 2 is a diagram of an exemplary Web page layout.
Figure 3:
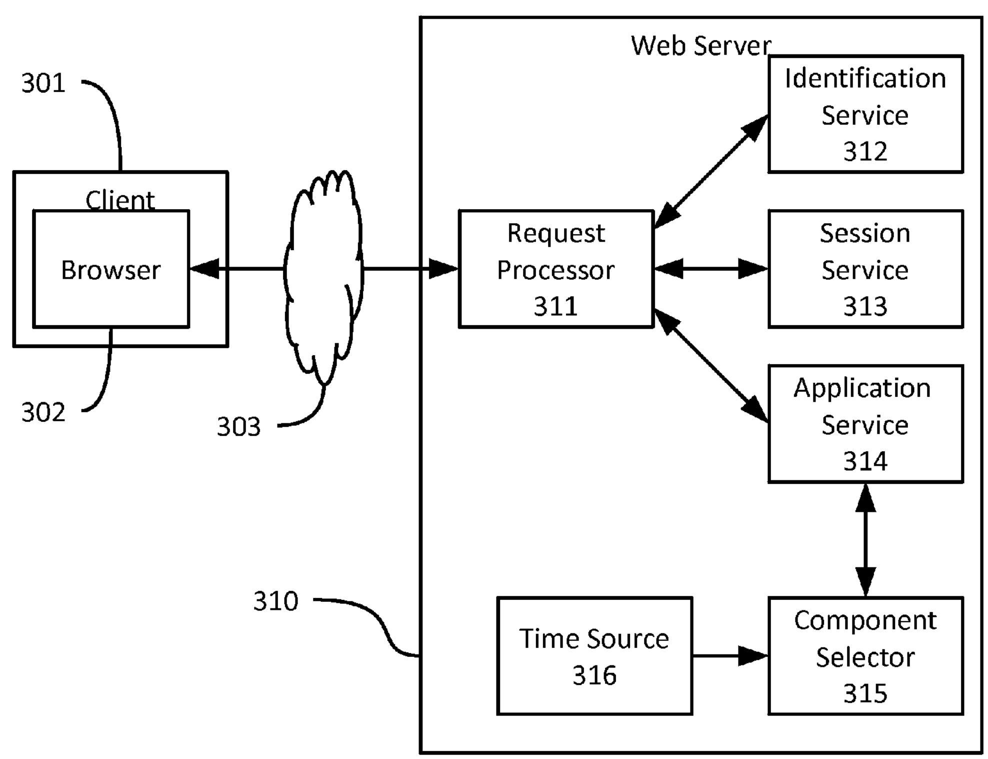
FIG. 3 is a diagram of an exemplary Web application server and client.

FIG. 3 shows an exemplary web server 310 communicating over network 303 with a browser software application 302 running on a client computer system 301. It will be recognized that web server 310 generally includes a plurality of software components, and that any of these components may be running on multiple computer processors, and that each of the exemplary components described herein may be further so subdivided.

Request processor 311 may comprise an HTTP server such as the Apache HTTP server, Microsoft Internet Information Services, etc. While the embodiments herein are generally described in terms of HTTP communication protocols and HTML presentation formats, it will be recognized by those skilled in the art that the concepts are applicable to a wide variety of communication protocols and data formats. Furthermore the client software may include, in addition to web browsers, dashboard applications, sidebars, tickers, etc. In an exemplary implementation, request processor 311 receives a request and parses the request to determine how to respond. Request processor 311 may simply return a data file specified by the request, or may delegate processing to another component (e.g., to application service 314) based on the request. In addition, request processor 311 may communicate with identification server 312 to associate the request with a particular client system and/or user (e.g., based on login credentials provided by the user). Request processor 311 may also communicate with session service 313 to associate the request with user session data (e.g., data stored on the web server in order to maintain a session state between requests).

Application service 314 may comprise a custom web application configured to process one or more types of requests from request processor, or may comprise a conventional web application server or object request broker. In exemplary embodiments, the application service 314 communicates, directly or indirectly, with a component selector 315 configured to receive a time and/or date from time source 316 and to select one or more interface components based on the time of day and/or date.

Component selector 315 may select interface components based on, for example, time of day, day of week, day of month, month within the fiscal quarter, holidays, business days, day or night, typically active time for the user, or off-hours for the user based on their historical norm, number of minutes since the last login, number of minutes since the last view of a given page, screen, or record set, number of minutes since login, number of minutes until the user session will expire, number of minutes since last user session ended, any combination of the above, etc.

Exemplary components that the component selector 315 may select may include landing pages, redirect URLs, or other screens to display after login success or initiation of the application, portlets or summary views to display on a "Home" page, executive dashboard views, dashboard view orders, tab orders, styles, scripts, executable code (e.g., Java Applets, ActiveX controls, Adobe Flash applications), etc. The application service 314 or other components may also adjust other aspects of the response and/or session in response to the time, such as whether previous session data or cookies are reused, session duration, etc.

Figure 4:
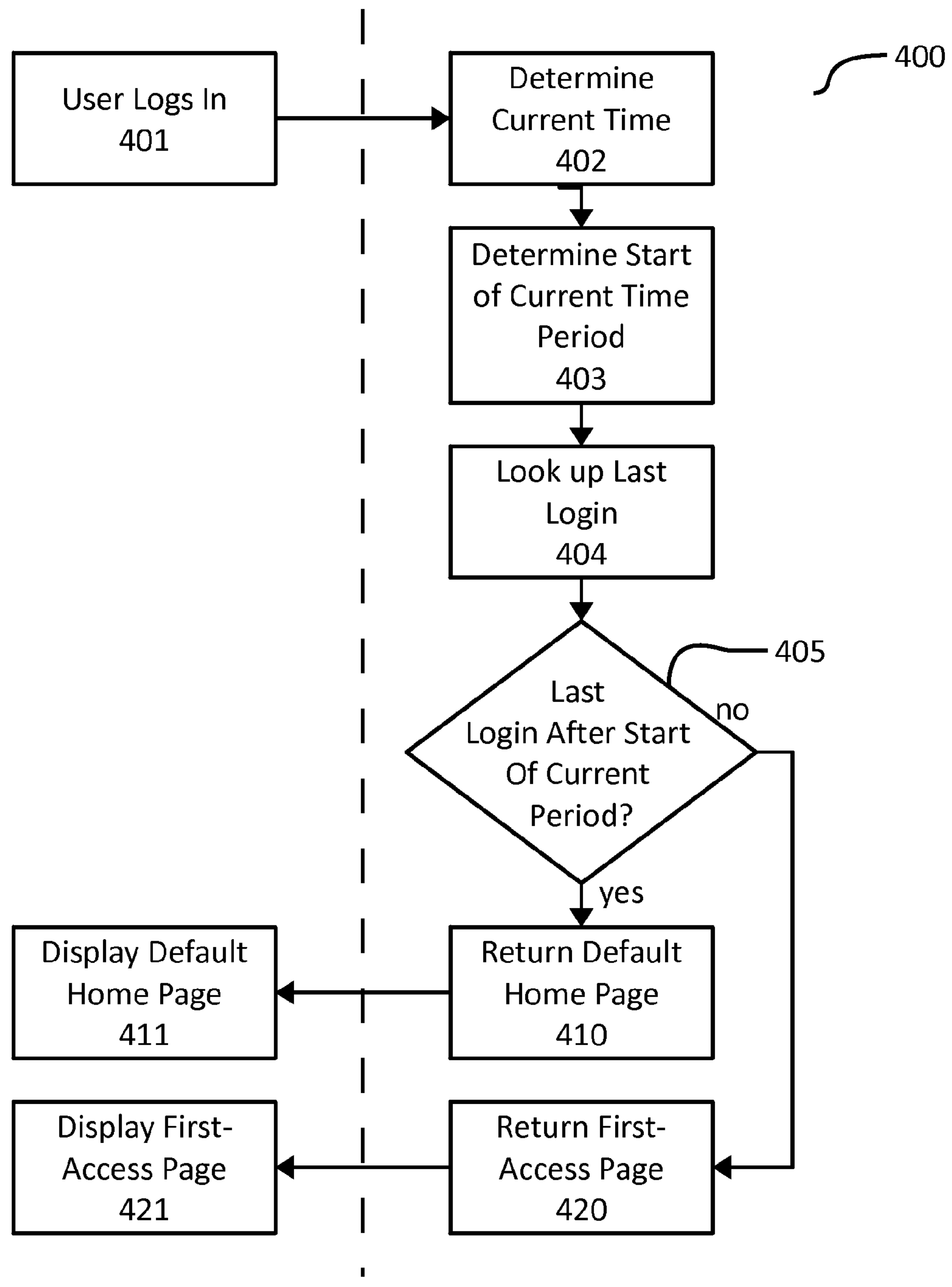
FIG. 4 is a flowchart showing an exemplary method for customizing a response for a user's first access during a time period.

Referring now to FIG. 4, flowchart 400 shows an exemplary method for customizing a response for a user's first access during a time period. At step 401, a user logs in to an application. For example, the user may enter a username and password, or use other login credentials, on a login page for a support case tracking web application. At step 402, the application determines the current time. At step 403, the application uses the current time to determine the current time period and the start time for that period. For example, a "user day" may be configured to begin at 3 A.M. each day.

At step 405, the application determines whether the user has previously logged or otherwise accessed the application after the start of the current period. If the user has previously logged in during the current period, then the application may return a default application home page including a default set of components at step 410. The browser or other client application then displays the default page at step 411. If, however, the user has not logged in to the system since the start of the current period, then the application may proceed to step 420 to return a set of components customized for a "first of the day" page. For example, in a support case tracking web application the "first of the day" page may include one or more components to show support cases and tasks scheduled for the day, cases that have not been updated in the last 72 hours, cases that have been opened since their last "first of the day" login, etc.

Figure 5:
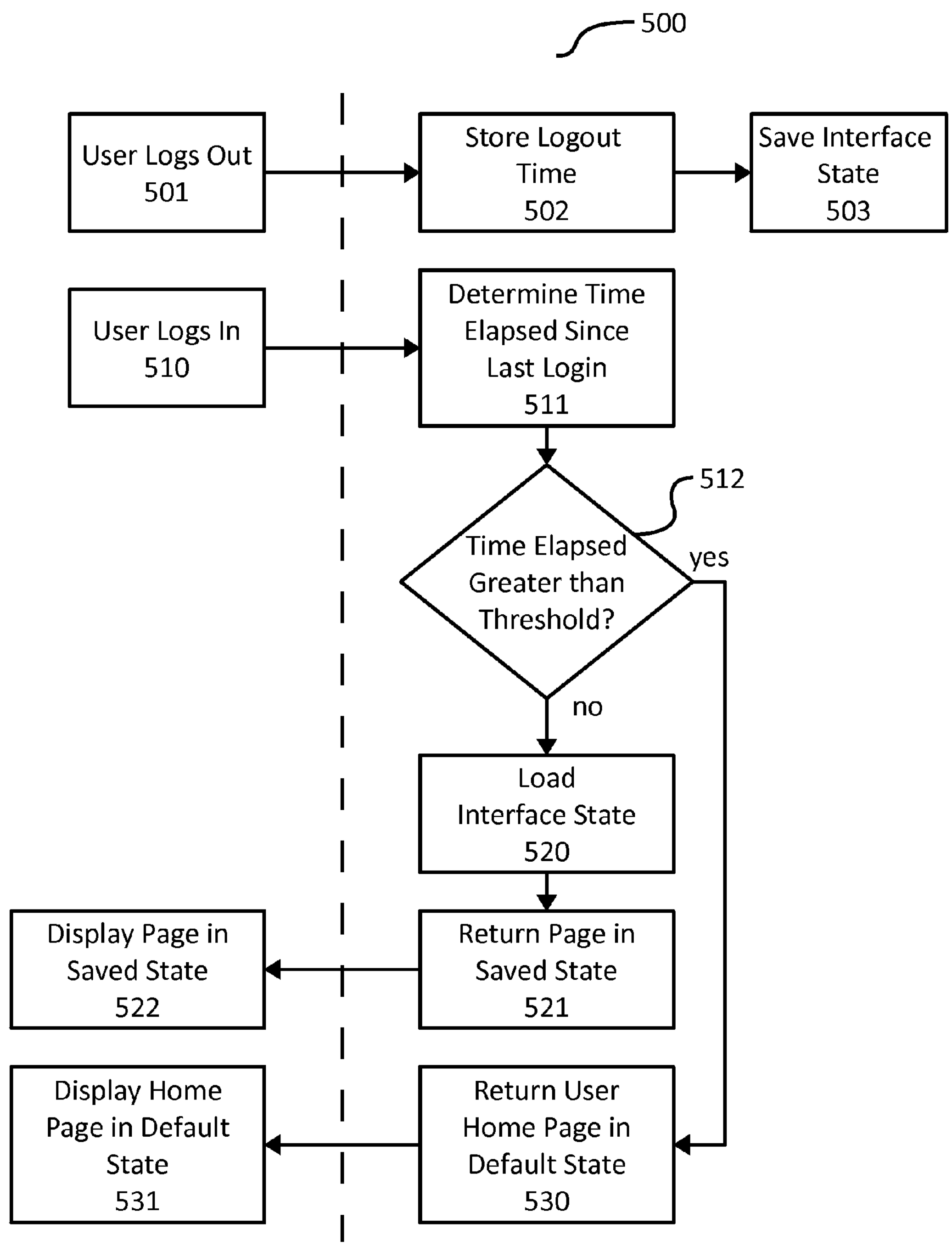
FIG. 5 is a flowchart showing an exemplary method for customizing a response based on the time of a user's previous access.

Referring now to FIG. 5, flowchart 500 shows an exemplary method for customizing a response based on the time of a user's previous access. At step 500, a user of a remote client logs out of the web application. At step 502, in processing the log-out request, the web application stores a time of the logout and at step 503 saves an interface state.

At step 510, the user logs in again. At step 511, the application determines the amount of time elapsed since the last login. At step 512, the application determines whether the time elapsed is greater than some threshold (e.g., one hour). If the time elapsed is not greater than the threshold, then the application loads the saved interface state at step 520 and returns a page in the saved state at step 521. For example, the page with saved state may include persisted values for a current page, search history, navigation tree state, etc. Otherwise, at step 530 the application may return a default home page (e.g., with no search history, a fully closed set of folders in the navigation tree, etc.).

Figure 6:
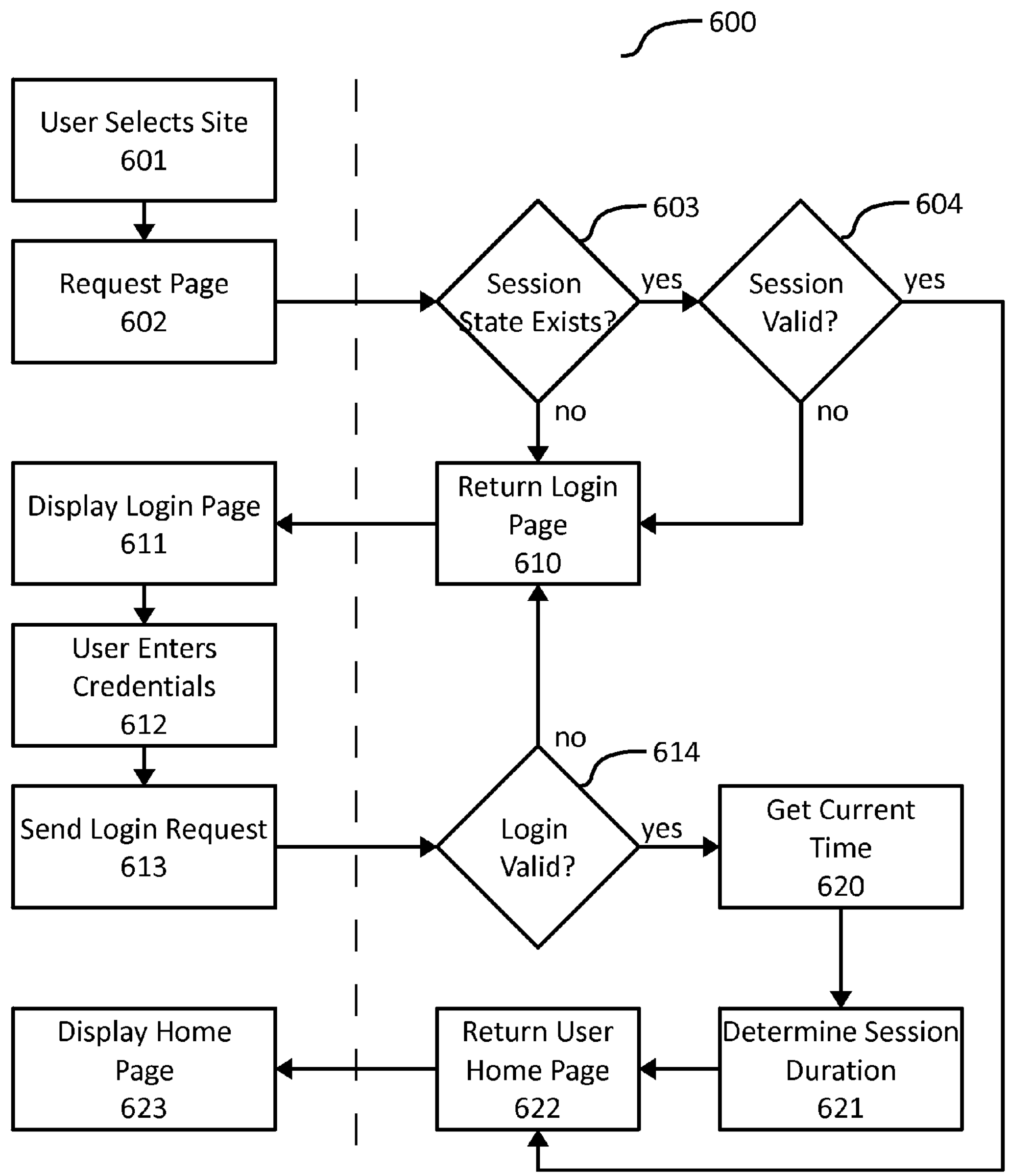
FIG. 6 is a flowchart showing an exemplary method for customizing a response based on the time of login.

Referring now to FIG. 6, flowchart 600 shows an exemplary method for customizing a response based on the time of login. At step 601 a user selects the application site (e.g., from a bookmark/favorites list, from a portal application, etc.) and at step 602 the client browser requests the appropriate page. At step 603 the application determines whether there is any session state associated with the request (e.g., from a session cookie or other parameter included in the request) and at step 604 determines whether the session is valid. If there is no valid session, then at step 610 the application returns a login page. In step 611 the client browser displays the login page. At step 612 the user enters login credentials, and at step 613 the client browser sends a login request to the application. At step 614 the application determines whether the login credentials are valid. If not, the login page is returned again at step 610.

If the login is valid, then the application proceeds to step 620 to determine the current time. At step 621, the application determines the session duration based on the current time. For example, if the current time is within the window of normal business hours Monday-Friday for the company (or user, if per-user values are available), the session may be granted with a duration of eight hours. If the current time is outside of normal business hours, then a different duration may be granted. For example, between 6 am and 8 pm on a normal workday, a four hour session may be granted. Or, a one hour session may be granted. Note that, in this example and all other examples, the duration of a session and the time period to which the duration applies can be defined in a variety of ways. In some implementations, the duration and time period are defined to maximize hardware resources. In other implementations, the duration and time periods are based on business needs, client agreement, or some other factor/combination of factors.

Figure 7:
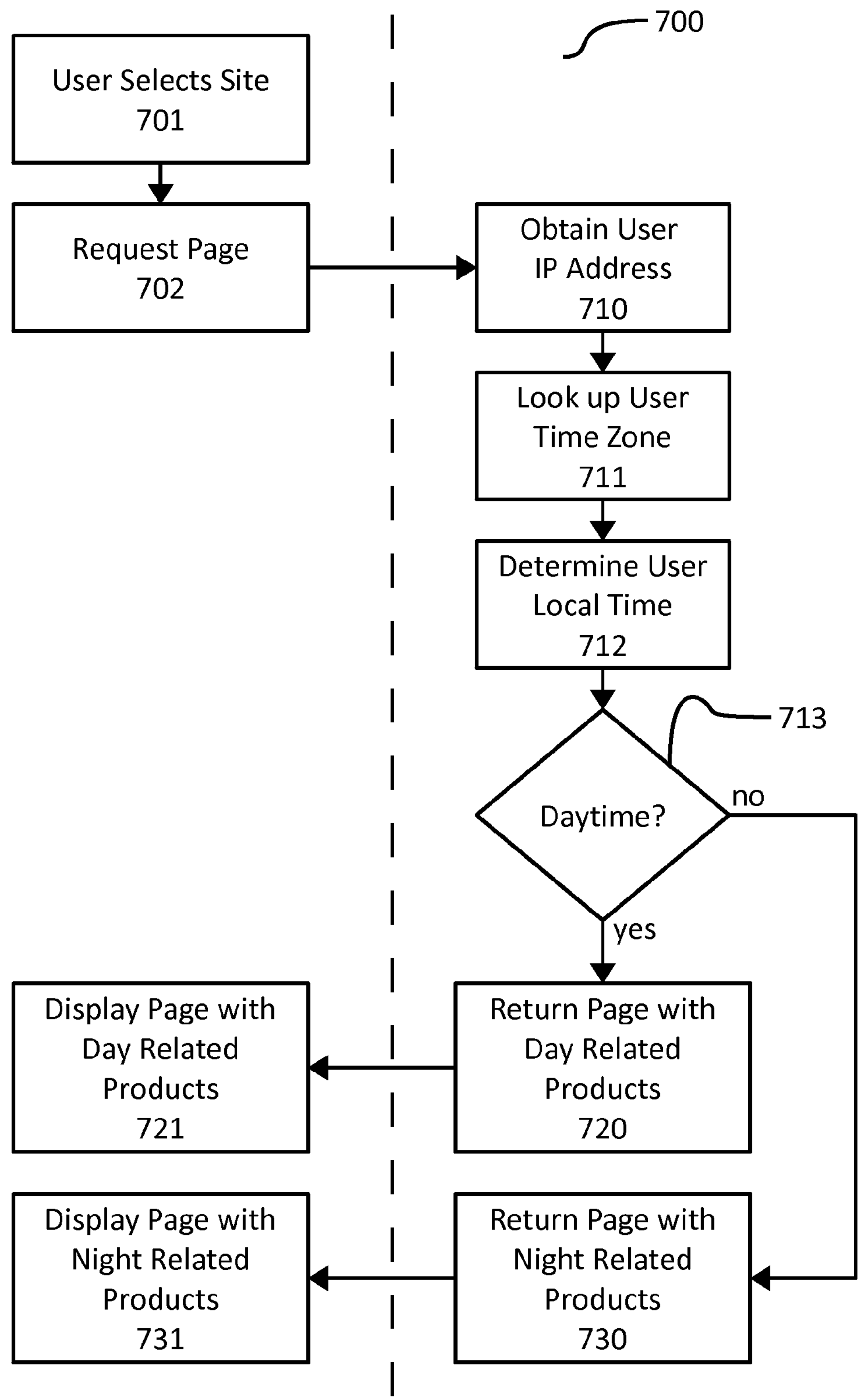
FIG. 7 is a flowchart showing an exemplary method for changing products included in a response based on the time of day.

Referring now to FIG. 7, flowchart 700 shows an exemplary method for changing products included in a response based on the time of day. At steps 701 and 702 the user selects the site and the browser sends a request to the application. At step 710, the application determines an internet protocol (IP) address of the client system. At step 711 the application determines a time zone for the user based on the IP address (e.g., using a GeoIP database) and at step 712 determines the user's local time by adjusting for the time zone. At step 713 the application determines the current time period, e.g. "daytime", for the user of the remote client. At step 720, the application returns a page based on the current time period. For example, if it is "daytime" at step 720 the application may return a page including business use or other "daytime" products on the page. Otherwise, at step 730 the application may return a page including other information for home use or "nighttime" products on the page.

Figure 8:
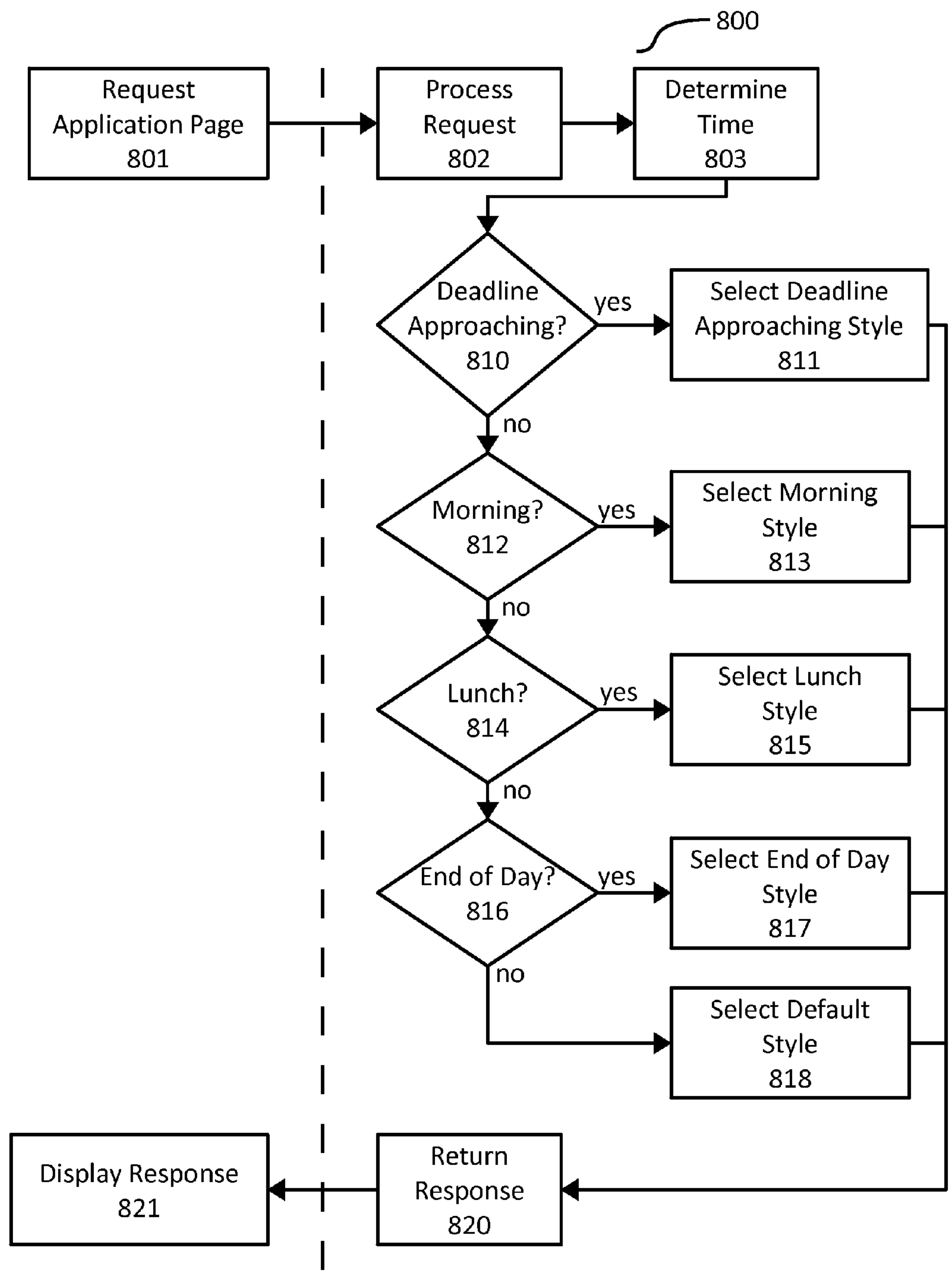
FIG. 8 is a flowchart showing an exemplary method for changing display styles in a response based on the time of day.

Referring now to FIG. 8, flowchart 800 shows an exemplary method for changing display styles in a response based on the time of day. An exemplary web application may generally be styled with primarily black text on a white background, with blue trim. Throughout the day, the remote client may request application pages at step 801, either in response to user activity or in response to scripts or other application logic executed on the client. The application processes the request at step 802, and at least part of the processing may include steps 803-818 to modify the display of the site in response to the time of day. Thus at step 803 the application determines the current time. In steps 810, 812, 814, and 816 the application may compare the current time to one or more predefined time periods (e.g., deadline approaching, morning, lunchtime, end of day) and adjust style components appropriately at steps 811, 813, 815, 817, and 818.

Thus, as the day progresses the default blue trim may change appearance slightly, becoming lighter during the mornings and through the afternoon, and progressively darker through late afternoon through evening, and very dark blue at night. For a business application or corporate intranet site, for example, the application may unobtrusively give workers an update on the relative time of day. While a digital clock included with most operating systems provides a specific time of day, the coloring could provide timing subtle cues to the user. For example, a schedule component may fade to gray during lunch break for a worker, fade to red if an action hasn't been taken in a given amount of time, fade to black as the dedicated call center hour's end of day approaches, etc.

Thus, the present invention provides methods, software, and computer systems for changing the user interface of a web application dynamically depending on the time at which the Web server is accessed in order to give the user quicker, easier, or automatic access to items, pages, data, or screens they need, without the user having to explicitly select or request these particular components.

It should be understood that the foregoing description is merely an example of the invention and that modifications and may be made thereto without departing from the spirit and scope of the invention and should not be construed as limiting the scope of the invention. The scope of the invention, therefore, should be determined with respect to the appended claims, including the full scope of equivalents thereof.

The invention claimed is:

1. A computer processing system including one or more processors and a non-transitory computer-readable medium storing computer-executable instructions for controlling the one or more processors to:

receive a first login request from a user at a first time;

register a second time at which the user logs out;

store an interface state for a web page responsive to the user logging out at the second time;

receive a second login request from the user at a third time after the second time;

determine a first amount of time that elapsed between the third time and the first time;

determine whether the first amount time is more than a first threshold amount of time;

provide, responsive to a determination that the first amount of time is more than a first threshold amount of time, the web page according to a default display state; and provide, responsive to a determination that the first amount of time is less than a first threshold amount of time, the web page according to the interface state.

2. The computer processing system of claim 1, wherein the interface state reflects changes made to the default display state by the user.

3. The computer processing system of claim 1, wherein the first threshold amount of time is one hour.

4. The computer processing system of claim 1, wherein the interface state includes one or more items selected from the group consisting of: persisted values for the web page, search history data associated with the web page, and navigation tree state for a navigation tree in the web page.

5. The computer processing system of claim 1, wherein the non-transitory computer-readable medium stores further computer-executable instructions for controlling the one or more processors to:

determine that the first time is during a first predefined time period during a predefined time interval;

determine whether any other login requests from the user have been received prior to the first time and within the first predefined time period;

provide, responsive to a determination that another login request from the user was received prior to the first time and within the first predetermined time period, a web page with first content; and provide, responsive to a determination that no other login request from the user was received prior to the first time and within the first predetermined time period, a web page with second content that is at least partially different from the first content.

6. The computer processing system of claim 5, wherein the first predefined time period is one of several predefined time periods during the predefined time interval.

7. The computer processing system of claim 6, wherein the predefined time interval is a day.

8. The computer processing system of claim 7, wherein:

the first content includes content for a default application home page, and the second content includes at least one piece of content that is not part of the default application home page and that is selected from the group consisting of: support cases and tasks scheduled for the day, support cases that have not been updated in the last 72 hours, and new support cases that have been opened since a previous first login request from the user was received, wherein the previous first login request from the user is the most recent login request from the user that was received a) during another day prior to the predefined time interval and b) prior to any other login requests from the user during a second predefined time period in the other day.

9. The computer processing system of claim 7, wherein the first predefined time period starts at 3:00 AM and ends at a time after noon.

10. The computer processing system of claim 1, wherein the non-transitory computer-readable medium stores further computer-executable instructions for controlling the one or more processors to:

determine a current local time of the user based on the first time;

select one or more products for inclusion in the webpage based on the current local time of the user; and include the one or more products selected based on the current local time of the user in the webpage.

11. The computer processing system of claim 10, wherein the non-transitory computer-readable medium stores further instructions for controlling the one or more processors to:

determine an internet protocol (IP) address associated with the user;

determine a time zone of the user based on the IP address; and determine the current local time of the user taking into account the time zone of the user.

12. The computer processing system of claim 10, wherein the non-transitory computer-readable medium stores further instructions for controlling the one or more processors to select business products for inclusion in the webpage when the local time of the user is associated with daytime.

13. The computer processing system of claim 10, wherein the non-transitory computer-readable medium stores further instructions for controlling the one or more processors to select nighttime products for inclusion in the webpage when the local time of the user is associated with nighttime.

14. The computer processing system of claim 1, wherein the default display state includes one or more items selected from the group consisting of: a fully closed set of folders in a navigation tree and a blank search history.

* * * * *